US010988577B2

(12) United States Patent
Yamada et al.

(10) Patent No.: US 10,988,577 B2
(45) Date of Patent: Apr. 27, 2021

(54) COPOLYMER OF DIALLYLAMINES AND SULFUR DIOXIDE, AND METHOD FOR PRODUCING SAME

(71) Applicant: NITTO BOSEKI CO., LTD., Fukushima (JP)

(72) Inventors: Nobuyuki Yamada, Koriyama (JP); Masaru Bunya, Koriyama (JP)

(73) Assignee: NITTO BOSEKI CO., LTD., Fukushima (JP)

( * ) Notice: Subject to any disclaimer, the term of this patent is extended or adjusted under 35 U.S.C. 154(b) by 0 days.

(21) Appl. No.: 16/540,863

(22) Filed: Aug. 14, 2019

(65) Prior Publication Data

US 2019/0367683 A1 Dec. 5, 2019

Related U.S. Application Data

(62) Division of application No. 15/740,099, filed as application No. PCT/JP2016/079893 on Oct. 7, 2016, now Pat. No. 10,442,895.

(30) Foreign Application Priority Data

Oct. 15, 2015 (JP) ................. 2015-203565

(51) Int. Cl.
  *C08G 75/22* (2006.01)
  *C08F 36/20* (2006.01)
  *C08F 2/06* (2006.01)
  *C08K 5/23* (2006.01)
  *C09D 11/106* (2014.01)
  *C09D 181/06* (2006.01)

(52) U.S. Cl.
  CPC ........... *C08G 75/22* (2013.01); *C08F 2/06* (2013.01); *C08F 36/20* (2013.01); *C08K 5/23* (2013.01); *C09D 11/106* (2013.01); *C09D 181/06* (2013.01)

(58) Field of Classification Search
  CPC ......... C08G 75/22; C08F 2/06; C09D 11/106; C09D 181/06; C08K 5/23
  See application file for complete search history.

(56) References Cited

U.S. PATENT DOCUMENTS

| | | | |
|---|---|---|---|
| 2007/0185281 A1* | 8/2007 | Song | A61K 8/817 525/375 |
| 2012/0116011 A1 | 5/2012 | Fukushima | |
| 2013/0109607 A1 | 5/2013 | Takayama | |
| 2013/0172523 A1 | 7/2013 | Sato | |

FOREIGN PATENT DOCUMENTS

| | | |
|---|---|---|
| CN | 102365305 A | 2/2012 |
| JP | S45-343 B | 1/1970 |
| JP | 2006-45363 A | 2/2006 |
| JP | 2008063467 A | 3/2008 |
| JP | 2008-88524 A | 4/2008 |
| JP | 2009-267206 A | 11/2009 |
| JP | 2011-077115 A | 4/2011 |
| KR | 10-2013-0108981 A | 10/2013 |
| WO | 2010/067854 A1 | 6/2010 |
| WO | 2011/148862 A1 | 12/2011 |

OTHER PUBLICATIONS

Office Action of Chinese Patent Application No. 201680038546.3 dated Aug. 1, 2019 (23 sheets, 9 sheets translation, 32 sheets total).
Japanese Office Action for corresponding Japanese Patent Application No. 2015-203565 dated Mar. 20, 2018 (2 sheets, 2 sheets translation, 4 sheets total).
Korean Office Action for corresponding Korean Patent Application No. 10-2017-7037945 dated Mar. 7, 2018 (5 sheets, 5 sheets translation, 10 sheets total).
Korean Office Action for corresponding Korean Patent Application No. 10-2017-7037945 dated Jul. 24, 2018 (2 sheets, 3 sheets translation, 5 sheets total).
International Search Report for International Application No. PCT/JP2016/079893 dated Dec. 13, 2016 (3 pages, 1 pages translation, 4 pages total).
Written Opinion of the International Searching Authority for International Application No. PCT/JP2016/079893 dated Dec. 13, 2018 (3 pages, 3 pages translation, 6 pages total).
Extended European Search Report for European Patent Application No. 16855352.7 dated May 10, 2019 (9 pages).
Office Action of corresponding Taiwanese Patent Application No. 105133077 dated Jun. 4, 2020 (5 sheets, 5 sheets translation, 10 sheets total).
Search Report for corresponding Taiwanese Patent Application No. 105133077 dated Jun. 4, 2020 (1 sheet, 1 sheet translation, 2 sheets total).

* cited by examiner

*Primary Examiner* — Shane Fang
(74) *Attorney, Agent, or Firm* — Kratz, Quintos & Hanson, LLP

(57) ABSTRACT

Provided are a copolymer of diallylamines and sulfur dioxide having a high molecular weight and a low content amount of impurities such as halogens, and a production method with which it is possible to produce such a copolymer relatively simply and at low cost. This problem is solved by: a copolymer having a weight-average molecular weight of 150,000 or higher obtained by GPC measurement and a degree of polymerization of 1000 or higher, the copolymer being obtained by copolymerizing sulfur dioxide and a sulfonate or alkyl sulfate salt of diallylamines having a specific structure; and a method for producing a copolymer, the method having a step for copolymerizing sulfur dioxide and a sulfonate or alkyl sulfate salt of diallylamines having a specific structure in ethylene glycol or in propylene glycol monomethyl ether.

6 Claims, No Drawings

COPOLYMER OF DIALLYLAMINES AND SULFUR DIOXIDE, AND METHOD FOR PRODUCING SAME

TECHNICAL FIELD

The present invention relates to a copolymer of a diallylamine and sulfur dioxide and a production method thereof, and more particularly to a copolymer of a diallylamine and sulfur dioxide having a high molecular weight and a low content of impurities, such as halogens, and a production method by which such a copolymer can be produced relatively simply at low cost.

BACKGROUND ART

Copolymers of a diallylamine, such as a diallyldialkylammonium chloride and a diallylalkyl amine hydrochloride and sulfur dioxide are produced industrially because they can be produced easily by copolymerizing such monomers, and there has been proposed to use them in the fine chemical fields, such as water-soluble paints and color fastness improvers for dyed goods. (See, for example, Patent Literature 1.)

As a method of obtaining a polyaminesulfone by copolymerizing a hydrochloride salt of a diallylamine and sulfur dioxide with a radical initiator, a polar solvent is used as described in Patent Literature 1. Although water is mainly used as the polar solvent in order to maintain solubility after polymerization or because the raw material hydrochloric acid is an aqueous solution, the average molecular weight of the resulting copolymer is several thousand at most when water is used as the solvent in conventional technologies.

On the other hand, although it is known that a copolymer of a diallylamine and sulfur dioxide having a high molecular weight is obtained by making the monomer concentration extremely high and performing polymerization with light even when using water as a solvent, it is difficult to carry out the polymerization quantitatively, and the operation becomes complicated, for example, pulverization becomes necessary in order to divide the resulting polymer into small portions because the resulting polymer is massive, and therefore, it was difficult to produce a copolymer having a high molecular weight industrially at low cost even by this method.

With rising global environmental awareness, various chemicals used in the fine chemical field have been required to be free of halogens, such as chlorine, and there are demand for copolymers of a salt other than diallylalkylamine hydrochlorides and sulfur dioxide instead of copolymers of a diallylalkylamine hydrochloride and sulfur dioxide.

Although a copolymer of a diallylamine and sulfur dioxide with high solubility in organic solvents without using chlorine has been synthesized by performing the synthesis using, for example, an alkylsulfate as an addition salt instead of the diallylalkylamine hydrochloride (see, for example, Patent Literature 2), the solubility that having been confirmed is only 2 wt. % at most and this is based on the powder obtained after the polymerization.

Although a diallylamine and sulfur dioxide copolymerize through formation of a charge transfer complex, sulfur dioxide partly yields sulfurous acid in a water solvent. It is commonly known that sulfurous acid is used as a chain transfer agent in polymerization. Therefore, when using a water solvent, it is difficult to obtain a copolymer with a high molecular weight and, for example, in the case of agitation polymerization, merely a copolymer having an average molecular weight of several tens of thousands at most is obtained by a method including addition of an acid (see, for example, Patent Literature 3).

On the other hand, in syntheses using an organic solvent, the resulting copolymer is insoluble in the organic solvent and, therefore, the copolymer precipitates rapidly in the form of a highly viscous paste form, falling in a state where it is difficult to control agitation cooling.

Although dimethyl sulfoxide and dimethylformamide are known as solvents excellent in solubility as disclosed in Patent Literature 1, dimethyl sulfoxide reacts with $SO_2$ to produce dimethyl sulfide and $SO_3$ and inhibits polymerization. For this reason, at a charge molar ratio of $SO_2$ to a diallylamine of about 1:1, which is intrinsically suitable for obtaining a copolymer having a high molecular weight, it is difficult to obtain a polyaminesulfone with a high degree of polymerization due to the influence of $SO_3$ generated from $SO_2$, which does not participate in polymerization. Moreover, dimethyl sulfide is a malodorous substance and has a possibility of worsening working environment. Dimethylformamide is decomposed into formic acid and dimethylamine under an acidic condition, which is the polymerization condition. Therefore, it is hard to consider dimethyl sulfoxide and dimethylformamide as proper and practical solvents.

For this reason, synthesis using an organic solvent has not been put in practical use.

When using water as a solvent, a charge transfer complex of a diallylamine and sulfur dioxide in water decomposes at high temperatures of 20° C. or higher and sulfur dioxide flows out of the system, resulting in drop of yield. For this reason, it was necessary to use an organic peroxide or an inorganic peroxide as an initiator for a copolymerization reaction in water and perform copolymerization while controlling the system mainly at a low temperature of 30° C. or lower utilizing a redox reaction with sulfurous acid, which has been by-produced by sulfur dioxide. Although this reaction can be applied also to organic solvents, it is difficult to obtain a copolymer with a high molecular weight because polymerization by a redox reaction leads to a large decomposition amount of the initiator.

CITATION LIST

Patent Literature

Patent Literature 1: JP-B-45-343
Patent Literature 2: JP-A-2006-45363
Patent Literature 3: WO 2011/148862

SUMMARY OF INVENTION

Problem to be Solved by Invention

In light of the limit of the conventional technologies described above, there has been demanded a method by which a copolymer of a diallylamine and sulfur dioxide having a high molecular weight and a low content of impurities, such as halogens, can be produced in a polar solvent such as water. The object of the present invention is to provide such a production method and such a copolymer, and more particularly provide a copolymer of a diallylamine and sulfur dioxide having a high molecular weight and a low content of impurities, such as halogens, and a production method by which such a copolymer can be produced relatively simply at low cost.

Means for Solving Problem

The present inventors investigated extensively in order to solve the above-described problems, and then found a copolymer of a diallylamine and sulfur dioxide having a high molecular weight and a high degree of polymerization and a production method thereof.

That is, the first invention of the present application relates to the following [1].

[1]

A copolymer having a weight average molecular weight of 150,000 or more and a degree of polymerization of 1,000 or more determined by GPC measurement, and obtained by copolymerizing a sulfonic acid salt or alkylsulfate salt of a diallylamine represented by Structural Formula 1, wherein $R_1$ and $R_2$ are each independently a hydrogen atom or a hydrocarbon group having 1 to 3 carbon atoms and X— is a sulfonic acid ion having 1 to 3 carbon atoms or an alkylsulfate ion having 1 to 3 carbon atoms, and sulfur dioxide represented by Structural Formula 2.

[Chemical Formula 1]

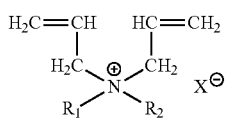

Structural Formula 1

[Chemical Formula 2]

Structural Formula 2

In the following, [2] to [7] and [15] to [18] are each a preferred embodiment of the first invention of the present application.

[2]

The copolymer as set forth in the above [1], wherein the proportion of the constitutional units derived from the sulfonic acid salt or alkylsulfate salt of a diallylamine and the constitutional units derived from the sulfur dioxide to all of the constitutional units of the copolymer is 90 mol % or more.

[3]

The copolymer as set forth in the above [1], wherein the ratio of the number of the constitutional units derived from the sulfonic acid salt or alkylsulfate salt of a diallylamine to the number of the constitutional units derived from the sulfur dioxide is from 0.7:1 to 1.3:1.

[4]

The copolymer as set forth in any one of the above [1] to [3], obtained by copolymerizing the sulfonic acid salt or alkylsulfate salt of a diallylamine and the sulfur dioxide in ethylene glycol or propylene glycol monomethyl ether.

[5]

The copolymer as set forth in the above [4], obtained in the form of a solution or a dispersion by performing polymerization in ethylene glycol or propylene glycol monomethyl ether.

[6]

The copolymer as set forth in any one of the above [1] to [5], obtained by copolymerizing the sulfonic acid salt or alkylsulfate salt of a diallylamine and the sulfur dioxide using a radical initiator that substantially does not start a redox reaction with sulfur dioxide at temperatures of from 0° C. to 100° C.

[7]

The copolymer as set forth in the above [6], wherein the radical initiator is an aliphatic azo compound.

The second invention of the present application relates to the following [8].

[8]

A production method of a copolymer, including the step of copolymerizing a sulfonic acid salt or alkylsulfate salt of a diallylamine represented by Structural Formula 1, wherein $R_1$ and $R_2$ are each independently a hydrogen atom or a hydrocarbon group having 1 to 3 carbon atoms and X— is a sulfonic acid ion having 1 to 3 carbon atoms or an alkylsulfate ion having 1 to 3 carbon atoms, and sulfur dioxide represented by Structural Formula 2 in ethylene glycol or propylene glycol monomethyl ether.

[Chemical Formula 3]

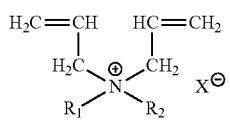

Structural Formula 1

[Chemical Formula 4]

Structural Formula 2

In the following, [9] to [4] are each a preferred embodiment of the second invention of the present application.

[9] The production method as set forth in the above [8], wherein the proportion of the sulfonic acid salt or alkylsulfate salt of a diallylamine and the sulfur dioxide to all of the monomers to be subjected to the copolymerization step is 90 mol % or more.

[10]

The production method as set forth in the above [8], wherein the molar ratio of the sulfonic acid salt or alkylsulfate salt of a diallylamine to the sulfur dioxide to be subjected to the copolymerization step is from 0.7:1 to 1.3:1.

[11]

The production method as set forth in any one of the above [8] to [10], wherein the copolymerization step is performed in ethylene glycol or propylene glycol monomethyl ether.

[12]

The production method as set forth in the above [11], wherein the copolymerization step is a step of obtaining a solution or a dispersion by performing polymerization in ethylene glycol or propylene glycol monomethyl ether.

[13]

The production method as set forth in any one of the above [8] to [12], wherein a radical initiator that substantially does not start a redox reaction with sulfur dioxide at temperatures of from 0° C. to 100° C. is used in the copolymerization step.

[14]

The production method as set forth in the above [13], wherein the radical initiator is an aliphatic azo compound.

[15]

A copolymer having a weight average molecular weight of 150,000 or more and a degree of polymerization of 1,000 or more determined by GPC measurement, and being a reaction product of a sulfonic acid salt or alkylsulfate salt of a diallylamine represented by Structural Formula 1, wherein $R_1$ and $R_2$ are each independently a hydrogen atom or a hydrocarbon group having 1 to 3 carbon atoms and X— is a sulfonic acid ion having 1 to 3 carbon atoms or an alkylsulfate ion having 1 to 3 carbon atoms, and sulfur dioxide represented by Structural Formula 2.

[Chemical Formula 5]

Structural Formula 1

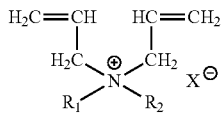

[Chemical Formula 6]

Structural Formula 2

[16]

The copolymer as set forth in the above [15], wherein the proportion of the constitutional units derived from the sulfonic acid salt or alkylsulfate salt of a diallylamine and the constitutional units derived from the sulfur dioxide to all of the constitutional units of the copolymer is 90 mol % or more.

[17]

The copolymer as set forth in the above [15], wherein the ratio of the number of the constitutional units derived from the sulfonic acid salt or alkylsulfate salt of a diallylamine to the number of the constitutional units derived from the sulfur dioxide is from 0.7:1 to 1.3:1.

[18]

A paint, a stain, or an electrophotographic toner including a copolymer as set forth in any one of the above [1] to 7 and [15] to [17].

Effect of Invention

According to the present invention, a copolymer of a diallylamine and sulfur dioxide having a high molecular weight can be obtained without employing photopolymerization performed in a high concentration aqueous solution or precipitation polymerization, which will lead to difficult handling in an organic solvent. Moreover, according to the method of the present invention, a desired high molecular weight copolymer can be obtained easily without performing complicated pulverization or dissolution work, which was conventionally required after polymerization. By using not chlorine but methane sulfonic acid or an ethylsulfate as an addition salt, a high molecular weight copolymer containing no halogens and being low in metal corrosiveness can be obtained easily.

MODE FOR CARRYING OUT INVENTION

The copolymer of a diallylamine and sulfur dioxide of the first invention of the present application is a copolymer having a weight average molecular weight of 150,000 or more and a degree of polymerization of 1,000 or more determined by GPC measurement, and obtained by copolymerizing a sulfonic acid salt or alkylsulfate salt of a diallylamine represented by Structural Formula 1, wherein $R_1$ and $R_2$ are each independently a hydrogen atom or a hydrocarbon group having 1 to 3 carbon atoms and X— is a sulfonic acid ion having 1 to 3 carbon atoms or an alkylsulfate ion having 1 to 3 carbon atoms, and sulfur dioxide represented by Structural Formula 2.

[Chemical Formula 7]

Structural Formula 1

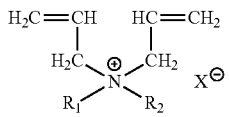

[Chemical Formula 8]

Structural Formula 2

(a) Diallylamine (Sulfonic Acid Salt or Alkylsulfate Salt of Diallylamine)

The diallylamine (a) to be used in the first invention of the present application is a sulfonic acid salt or alkylsulfate salt of a diallylamine having the structure represented by the above Structural Formula 1.

In the above Structural Formula 1, $R_1$ and $R_2$ are each independently a hydrogen atom or a hydrocarbon group having 1 to 3 carbon atoms. Preferably, $R_1$ and $R_2$ are each independently a hydrogen atom or an alkyl group having 1 to 3 carbon atoms. Examples of the alkyl group having 1 to 3 carbon atoms include a methyl group, an ethyl group, and a propyl group, wherein the propyl group may be either linear or branched.

In the above Structural Formula 1, X— is a sulfonic acid ion having 1 to 3 carbon atoms or an alkylsulfate ion having 1 to 3 carbon atoms.

By not using a halogen-based salt such as hydrochloride salt but using a sulfonic acid salt or alkylsulfate salt as the addition salt, a high molecular weight copolymer containing no halogens and being low in metal corrosiveness can be obtained in a simple way.

X— should just be a sulfonic acid ion having 1 to 3 carbon atoms or an alkylsulfate ion having 1 to 3 carbon atoms and has no other limitations. Nevertheless, as the sulfonic acid ion having 1 to 3 carbon atoms, an ion of methanesulfonic acid, ethanesulfonic acid, or propanesulfonic acid is preferably used, and as the alkylsulfate ion having 1 to 3 carbon atoms, an ion of methylsulfate, ethylsulfate, or propylsulfate is preferably used.

The diallylamine (a) to be used in the first invention of the present application should just be one having the structure represented by the above Structural Formula 1 and has no other limitations. Nevertheless, it preferably is a quaternary ammonium, such as diallyldimethylammonium, diallylethylammonium, and diallyldiethylammonium; a sulfonic acid salt or alkylsulfate salt of diallylamine, diallylmethylamine, diallylethylamine, or diallylpropylamine.

Preferred specific examples of the diallylamine (a) to be used in the first present invention include, but are not limited to, diallyldimethylammonium methylsulfate, diallylethylmethylammonium methylsulfate, diallyldiethylammonium methylsulfate, diallyldimethylammonium ethylsulfate, diallylethylmethylammonium ethylsulfate, diallyldiethylammonium ethylsulfate, diallylamine, diallylmethylamine, diallylethylamine, and diallylpropylamine.

(b) Sulfur Dioxide

The sulfur dioxide (b) to be used in the first invention of the present application has the structure represented by the following Structural Formula 2.

[Chemical Formula 9]

Structural Formula 2

The copolymer of a diallylamine and sulfur dioxide of the first invention of the present application is a copolymer obtained by copolymerizing a sulfonic acid salt or alkylsulfate salt of a diallylamine represented by the above Structural Formula 1 (a) and sulfur dioxide (b) represented by the Structural Formula 2, and therefore is a copolymer comprising constitutional units derived from a sulfonic acid salt or alkylsulfate salt of a diallylamine represented by the above Structural Formula 1 (a) and constitutional units derived from sulfur dioxide (b).

The copolymer of a diallylamine and sulfur dioxide of the first invention of the present application may be composed of only constitutional units derived from a sulfonic acid salt or alkylsulfate salt of a diallylamine represented by the above Structural Formula 1 (a) and constitutional units derived from sulfur dioxide (b), or alternatively it may have constitutional units other than the constitutional units derived from a sulfonic acid salt or alkylsulfate salt of a diallylamine represented by the above Structural Formula 1 (a) and the constitutional units derived from sulfur dioxide (b).

The copolymerization component other than the sulfonic acid salt or alkylsulfate salt of a diallylamine represented by the above Structural Formula 1 (a) and sulfur dioxide (b) should just be a compound copolymerizable with the sulfonic acid salt or alkylsulfate salt of a diallylamine represented by the above Structural Formula 1 (a) and sulfur dioxide (b) and has no other limitations. Nevertheless, from the viewpoint of easiness of copolymerization or control of properties of the copolymer, allylamines other than sulfonic acid salts or alkylsulfate salts are preferred, and diallylamines are particularly preferred. Specific examples of preferable allylamines include, but are not limited to, allylamine, methylallylamine, and dimethylallylamine, and specific examples of preferable diallylamines include, but are not limited to, diallylamine, methyldiallylamine, and dimethyl diallylamine. Their hydrochlorides, hydrobromides, hydroiodides, hydrofluorides, sulfates, carboxylates, dicarboxylates, phosphates, etc. can also be used. When using a copolymerizing component including halogen, such as a hydrochloride salt, attention should be paid to use it in an amount within a range being not contrary to the object of the present invention.

It is also possible to use an acid having a copolymerizable double bond, such as acrylic acid, as a copolymerization component.

In the copolymer of a diallylamine and sulfur dioxide of the first invention of the present application, even when having constitutional units other than the constitutional units derived from a sulfonic acid salt or alkylsulfate salt of a diallylamine represented by the above Structural Formula 1 (a) and the constitutional units derived from sulfur dioxide (b), it is preferred that the constitutional units derived from the sulfonic acid salt or alkylsulfate salt of a diallylamine represented by the above Structural Formula 1 (a) and the constitutional units derived from sulfur dioxide (b) occupy the major part of all of the constitutional units, and it is more preferred that the proportion of the constitutional units derived from the sulfonic acid salt or alkylsulfate salt of a diallylamine (a) and constitutional units derived from the sulfur dioxide (b) to all of the constitutional units of the copolymer is 90 mol % or more. The percentage is more preferably 99% or more, and particularly preferably 99.9% or more. By these constitutional units' occupying the major portions of all the constitutional units, it becomes easier to realize physical properties suitable for the application of the present invention, such as water-soluble paints and color fastness improvers for dyed goods.

The proportion between the constitutional units (a) derived from a sulfonic acid salt or alkylsulfate salt of a diallylamine and the constitutional units (b) derived from sulfur dioxide in the copolymer of the first invention of the present application is not particularly limited and may be any proportion as long as they are copolymerizable. From the viewpoint of increasing the molecular weight of a copolymer, it is preferred that the numbers of both these constitutional units are not significantly different from each other, for example, the ratio of the number of the constitutional units (a) derived from the sulfonic acid salt or alkylsulfate salt of a diallylamine and the constitutional units (b) derived from sulfur dioxide is preferably from 0.7:1 to 1.3:1. The ratio is more preferably from 0.8:1 to 1:1.2, and particularly preferably from 0.9:1 to 1:1.1.

The copolymer of the first invention of the present application is characterized by having a high molecular weight which has not been attained by any conventional technologies in the technical field of copolymers of diallylamines and sulfur dioxide. Specifically, the weight average molecular weight ($M_w$) determined by GPC measurement of the copolymer of the first invention of the present application is 150,000 or more, more preferably 200,000 or more, and particularly preferably 300,000 or more.

The copolymer of the first invention of the present application is a copolymer having a large number of constitutional units that has not been obtained by conventional technologies in the technical field of copolymers of a diallylamine and sulfur dioxide, and the degree of polymerization thereof is 1000 or more, more preferably 1400 or more, and particularly preferably 10000 or more.

Since halogen is not used as an addition salt as a raw material, the copolymer of the first invention of the present application has a small amount of halogen content or is substantially halogen-free. More specifically, the halogen content of the copolymer of the first invention of the present application rarely exceeds usual halogen concentrations of the diallylamine and the sulfur dioxide that are source materials and the solvent to be used in the production, and it is usually less than 500 ppm, preferably less than 100 ppm, and particularly preferably less than 10 ppm.

Since most of the halogens which usually can exist in an actual process are chlorine (Cl), the halogen content may be evaluated in terms of the Cl content as a simplified method, and the Cl content in this case is also usually less than 500 ppm, preferably less than 100 ppm, and particularly preferably less than 10 ppm.

Although there is no particular limitation on the production method of the copolymer of the first invention of the present application, it is preferred to produce it by the production method of the second invention of the present application.

(Production Method of a Copolymer of a Diallylamine and Sulfur Dioxide)

The production method of the copolymer of the second invention of the present application is a method for producing a copolymer, comprising the step of copolymerizing (a) a sulfonic acid salt or alkylsulfate salt of a diallylamine represented by Structural Formula 1, wherein $R_1$ and $R_2$ are each independently a hydrogen atom or a hydrocarbon group having 1 to 3 carbon atoms and X— is a sulfonic acid ion having 1 to 3 carbon atoms or an alkylsulfate ion having 1 to 3 carbon atoms, and (b) sulfur dioxide represented by Structural Formula 2 in ethylene glycol or propylene glycol monomethyl ether.

[Chemical Formula 10]

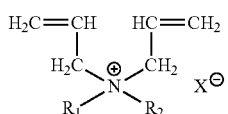

Structural Formula 1

[Chemical Formula 11]

Structural Formula 2

The sulfonic acid salt or alkylsulfate salt of a diallylamine represented by Structural Formula 1 (a) and the sulfur dioxide (b) in the production method of the second invention of the present application are the same as those which have already been described with respect to the first invention of the present application.

According to the second invention of the present application, copolymerizing the sulfonic acid salt or alkylsulfate salt of a diallylamine represented by Structural Formula 1 (a) and the sulfur dioxide (b) in a specific solvent, more specifically, in ethylene glycol or propylene glycol monomethyl ether renders it possible to produce a copolymer of the diallylamine and sulfur dioxide having a high molecular weight and a low content of impurities such as halogens, which was difficult to produce by conventional technologies.

Although the quantity of the ethylene glycol solvent or the propylene glycol monomethyl ether solvent to be used has no particular limitations and they can be used in any amount as long as the copolymerization reaction advances appropriately, it is preferred to use them in an amount with which the concentration of the monomers is 1 to 70% by mass, and it is more preferred to use them in an amount with which the concentration of the monomers is 10 to 30% by mass.

In the production method of the second invention of the present application, it is preferred to perform the copolymerization in ethylene glycol or propylene glycol monomethyl ether and obtain the copolymer in the form of a solution or dispersion. As a result of obtaining the copolymer in the form of a solution or dispersion, a desired high molecular weight copolymer can be obtained simply without performing complicated pulverization or dissolution operation, which was conventionally required after polymerization.

In the production method of the second invention of the present application, a sulfonic acid salt or alkylsulfate salt of a diallylamine (a) and sulfur dioxide (b) are subjected to a copolymerization step. During this operation, a monomer other than the sulfonic acid salt or alkylsulfate salt of a diallylamine (a) and the sulfur dioxide (b) may be subjected to the copologether. Even in this case, the proportion of the sulfonic acid salt or alkylsulfate salt of a diallylamine (a) and the sulfur dioxide (b) to the all of the monomers to be subjected to the copolymerization step is preferably 90 mol % or more, more preferably 99 mol % or more, and particularly preferably 99.9 mol % or more.

In the production method of the second invention of the present application, the proportion of the sulfonic acid salt or alkylsulfate salt of a diallylamine (a) and the sulfur dioxide (b) to be subjected to the copolymerization step is not particularly limited and may be any proportion as long as they are copolymerizable. From the viewpoint of increasing the molecular weight of a copolymer, it is preferred that the amounts of both these monomers are not significantly different from each other; for example, the molar ratio between the sulfonic acid salt or alkylsulfate salt of a diallylamine (a) and the sulfur dioxide (b) is preferably from 0.7:1 to 1.3:1. The ratio is more preferably from 0.8:1 to 1:1.2, and particularly preferably from 0.9:1 to 1:1.1.

In the production method of the second invention of the present application, it is preferred to use a radical initiator that substantially does not start a redox reaction with sulfur dioxide at temperatures of from 0° C. to 100° C. in the copolymerization step.

Usually, the yield of a charge transfer complex of a diallylamine and sulfur dioxide lowers at high temperatures of 20° C. or higher because the complex is decomposed at such temperatures and sulfur dioxide will flow out of the system. For this reason, in conventional technologies, the copolymerization reaction of a diallylamine and sulfur dioxide is performed mainly in an aqueous system and it was necessary to perform copolymerization while controlling the system at low temperatures of 30° C. or lower using an organic or inorganic peroxide as an initiator and utilizing a redox reaction with sulfurous acid by-produced by sulfur dioxide. Although this reaction can be applied also to an organic solvent system, it was difficult to obtain a copolymer having a high molecular weight because polymerization by a redox reaction leads to a large decomposition amount of the initiator.

In one preferred aspect of the above-described second invention of the present application, by performing radical polymerization using a radical initiator that substantially does not start a redox reaction with sulfur dioxide at temperatures of from 0° C. to 100° C., preferably an aliphatic azo-based initiator, a high molecular weight polyamine sulfone copolymer in the form of a homogeneous solution (dissolution or dispersion) can be obtained easily, which is preferable.

By using such a radical initiator, it is possible to advance the polymerization reaction without adversely affecting the copolymerization components, especially sulfur dioxide.

As the radical initiator that substantially does not start a redox reaction with sulfur dioxide at temperatures of from 0° C. to 100° C., aliphatic azo-based compounds are preferred; examples of particularly preferable radical initiators include 2,2'-azobis(4-methoxy-2,4-dimethylvaleronitrile), 2,2'-azobis(2,4-dimethylvaleronitrile), 2,2'-azobisisobutyronitrile, 2,2'-azobis(2-methylpropionate), and 2,2'-azobis[2-(2-imidazolin-2-yl)propane].

Although the amount of the radical initiator to be used has no particular limitations and can be set appropriately from the viewpoints of the reaction rate, stability of the reaction, etc., it is preferably used in an amount of 0.1 to 30% by mass, more preferably 1 to 10% by mass, relative to the total mass of the monomers.

The copolymer of the sulfonic acid salt or alkylsulfate salt of a diallylamine represented by Structural Formula 1 (a) and sulfur dioxide (b), which is obtained by the production method of the second invention of the present application has a high molecular weight and a high degree of polymerization as compared with copolymers obtained by production methods of conventional technologies. Preferably, the copolymer has a molecular weight and a degree of polymerization equivalent to those of the copolymer of the first invention of the present application, namely, a weight average molecular weight of 150,000 or more and a degree of polymerization of 1,000 or more.

The preferred properties which the copolymer obtained by the production method of the second invention of the present application should have other than those described above are the same as those described in relation with the copolymer of the first invention of the present application.

The copolymer of the first invention of the present application and the copolymer obtained by the production method of the second invention of the present application are copolymers of a diallylamine and sulfur dioxide having a high molecular weight and a high degree of polymerization as compared with the copolymers of conventional technologies and having a content of impurities, such as halogens, and therefore, they can be used suitably for the applications for which the diallylamine-based (co)polymers have conventionally been used. In particular, they can be used suitably in a paint, a stain, or an electrophotographic toner.

EXAMPLES

The present invention is described in more detail below with reference to examples. The scope of the present invention is not limited by the examples in any meanings.

The methods for measuring the weight average molecular weights and the polymerization yields of copolymers obtained in individual examples/comparative examples are as follows:

(i) Weight Average Molecular Weight of Copolymer

A copolymer was measured for a weight average molecular weight (Mw) by gel permeation chromatography (GPC method) using a Hitachi L-6000 high-performance liquid chromatography.

A Hitachi L-6000 was used as the eluant line pump, a Shodex RI-101 differential refractive index detector was used as the detector, and a water-base gel filtration type GS-220HQ column (exclusion limit molecular weight 3,000) and a GS-620HQ (exclusion limit molecular weight 2,000,000) column of Shodex Asahi Pack which were connected in series were used as the column. A sample having the concentration of 0.5 g/00 ml was prepared using an eluant, and 20 µl of the resultant solution was used. A 0.4 mol/liter sodium chloride aqueous solution was used as the eluant. The measurement was carried out at the column temperature of 30° C. and the flow rate of 1.0 ml/minute. A calibration curve was determined using, as reference materials, polyethylene glycols having molecular weights of 106, 194, 440, 600, 1,470, 4,100, 7,100, 10,300, 12,600, 23,000, etc., and on the basis of the calibration curve, the weight average molecular weight (Mw) of the copolymer was determined.

(ii) Polymerization Yield of Copolymer

The polymerization yield of the copolymer was determined on the basis of a peak area ratio obtained by a GPC method.

(iii) Degree of Polymerization of Copolymer

The degree of polymerization of the copolymer was calculated by the following calculation formula from the weight average molecular weight obtained by the GPC method.

Degree of polymerization=(weight average molecular weight)/(unit molecular weight)

The unit molecular weight (unit MW) as used herein is the molecular weight per repeating unit in the polymer. When the polymer is a copolymer, in other words, when the polymer has two or more types of constitutional units derived from different monomers, the molecular weights of the individual constitutional units and the proportions thereof (the sum total is 1) are multiplied and then a weighted average obtained by integrating the products is taken as the unit molecular weight.

By dividing the weight average molecular weight by the unit molecular weight, the degree of polymerization (the average number of repeating units) can be obtained.

(iv) Halogen (Cl) Content

Halogen (Cl) contents were measured for the copolymers obtained by using combustion ion chromatography. As a combustion apparatus, Mitsubishi Chemical Analytech AQF-100 was used. About 50 mg of a sample was taken in a quartz boat and burned (electric furnace temperature: Inlet 900° C., Outlet 1000° C.), and the gas generated was absorbed in 5 ml of an absorbing solution ($H_2O_2$: 900 ppm, Br: 1 ppm (internal standard)). The absorption liquid was analyzed with an anion chromatography DIONEX ICS-1000 (guard column: AG-12A, column: AS12A, suppressor: ASRS, eluant: 2.7 mM sodium carbonate+0.3 mM sodium hydrogencarbonate, flow rate: 1.3 ml/minute, detector: conductometric detector) and the halogen (Cl) content was determined.

Example 1 (Production of a Copolymer of Diallylamine-Methane Sulfonic Acid Salt and Sulfur Dioxide Using Ethylene Glycol Solvent)

A 100-ml three-neck flask equipped with a stirrer, a thermometer, and a glass stopper was charged with 72.04 g (an amount corresponding to the monomer concentration of 20% by mass) of ethylene glycol, 0.07 mol of methane sulfonic acid, and 0.07 mol of diallylamine with ice-water cooling. After charging 0.07 mol of sulfur dioxide with cooling at a temperature of 20° C. or lower, the temperature was raised to 30° C. and an initiator V-70 (2,2'-azobis(4-methoxy-2,4-dimethylvaleronitrile)) was added in an amount of 5% by mass relative to the monomers and polymerization was carried out. The GPC yield after 24 hours was 94.86%/6, and a copolymer having the $M_W$ of 323,151 in a pale yellow transparent highly viscous liquid form was obtained. The halogen (Cl) content of the copolymer was 9 ppm.

Example 2 (Production of a Copolymer of Diallylmethylamine-Methane Sulfonic Acid Salt and Sulfur Dioxide Using Ethylene Glycol Solvent)

A 100-ml three-neck flask equipped with a stirrer, a thermometer, and a glass stopper was charged with 75.97 g (an amount corresponding to the monomer concentration of 20% by mass) of ethylene glycol, 0.07 mol of methane sulfonic acid, and 0.07 mol of diallylmethylamine with ice-water cooling. After charging sulfur dioxide with cooling at a temperature of 20° C. or lower, the temperature was raised to 30° C. and an initiator V-70 was added in an amount of 5% by mass relative to the monomers and polymerization was carried out. The GPC yield after 24 hours was 97.00%, and a copolymer having the $M_W$ of 533,470 in a colorless highly viscous liquid form was obtained. The halogen (Cl) content of the copolymer was 3 ppm.

Example 3 (Production of a Copolymer of Diallylethylamine-Methane Sulfonic Acid Salt and Sulfur Dioxide Using Ethylene Glycol Solvent)

A 100-ml three-neck flask equipped with a stirrer, a thermometer, and a glass stopper was charged with 79.90 g (an amount corresponding to the monomer concentration of 20% by mass) of ethylene glycol, 0.07 mol of diallylethylamine and 0.07 mol of methane sulfonic acid with ice-water cooling. After charging sulfur dioxide with cooling at a temperature of 20° C. or lower, the temperature was raised to 30° C. and an initiator V-70 was added in an amount of 5% by mass relative to the monomers and polymerization was carried out. The GPC yield after 24 hours was 97.55%, and a copolymer having the $M_W$ of 284.344 in an orange highly viscous liquid form was obtained. The halogen (Cl) content of the copolymer was 2 ppm.

Example 4 (Production of a Copolymer of Diallylmethylethylammonium Ethylsulfate and Sulfur Dioxide Using Ethylene Glycol Solvent)

A 100-ml three-neck flask equipped with a stirrer, a thermometer, and a glass stopper was charged with 39.53 g (an amount corresponding to the monomer concentration of 20% by mass) of ethylene glycol and 0.03 mol of diallylmethylethylammonium ethylsulfate. After charging sulfur dioxide with cooling at a temperature of 20° C. or lower in ice water, the temperature was raised to 30° C. and an initiator V-70 was added in an amount of 5% by mass relative to the monomers and polymerization was carried out. The GPC yield after 24 hours was about 95% (it was difficult to distinguish the peak of ethylene glycol and the peak of diallylmethylethylammonium because of their overlapping), and a copolymer having the $M_W$ of 283,479 in a colorless transparent liquid form was obtained. The halogen (Cl) content of the copolymer was 0 ppm.

Example 5 (Production of a Copolymer of Diallyldiethylammonium Ethylsulfate and Sulfur Dioxide Using Ethylene Glycol Solvent)

A 100-ml three-neck flask equipped with a stirrer, a thermometer, and a glass stopper was charged with 82.43 g (an amount corresponding to the monomer concentration of 20% by mass) of ethylene glycol and 0.06 mol of diallyldiethylammonium ethylsulfate. After charging sulfur dioxide with cooling at a temperature of 30° C. or lower in ice water, the temperature was raised to 30° C. and an initiator V-70 was added in an amount of 0.5% by mass relative to the monomers and polymerization was initiated. After 3.5 hours, 0.5% by mass (1.0%/o by mass in total) of the initiator V-70 was further added and the polymerization was continued. The GPC yield after 24 hours was 17.3%, and the $M_W$ was 131,248. In the second day, 1.0% by mass, relative to the monomers, of the initiator V-70 was added twice (3.0% by mass in total) and the polymerization was further carried out. The GPC yield after 48 hours was 56.1% and the $M_W$ was 189,408. In the third day, 1.0% by mass, relative to the monomers, of the initiator V-70 was added twice (5.0% by mass in total) and the polymerization was further carried out. The GPC yield after 72 hours was 95.29%, and a copolymer having the $M_W$ of 178,786 in a yellow liquid form was obtained. The halogen (Cl) content of the copolymer was 2 ppm.

Example 6 (Production of a Copolymer of Diallylamine-Methane Sulfonic Acid Salt and Sulfur Dioxide Using Propylene Glycol Monomethyl Ether Solvent)

A 50-ml three-neck flask equipped with a stirrer, a thermometer, and a glass stopper was charged with 36.02 g (an amount corresponding to the monomer concentration of 20% by mass) of propylene glycol monomethyl ether, 0.035 mol of diallylamine and 0.035 mol of methane sulfonic acid with ice-water cooling. After charging 0.035 mol of sulfur dioxide with cooling at a temperature of 25° C. or lower, the temperature was raised to 30° C. and an initiator V-70 was added in an amount of 5% by mass relative to the monomers and polymerization was carried out. The GPC yield after 24 hours was 95.96%, and a copolymer having the $M_W$ of 159,206 in a milk white emulsion solution form was obtained.

Example 7 (Production of a Copolymer of Diallylmethylamine-Methane Sulfonic Acid Salt and Sulfur Dioxide Using Propylene Glycol Monomethyl Ether Solvent)

A 50-ml three-neck flask equipped with a stirrer, a thermometer, and a glass stopper was charged with 37.99 g (an amount corresponding to the monomer concentration of 20% by mass) of propylene glycol monomethyl ether, 0.035 mol of methane sulfonic acid, and 0.035 mol of diallylmethylamine with ice-water cooling. After charging 0.035 mol of sulfur dioxide with cooling at a temperature of 25° C. or lower, the temperature was raised to 30° C. and an initiator V-70 was added in an amount of 5% by mass relative to the monomers and polymerization was carried out. The GPC yield after 24 hours was 94.06%, and a copolymer having the $M_W$ of 199.065 in a milk white emulsion solution form was obtained.

Example 8 (Production of a Copolymer of Diallylethylamine-Methane Sulfonic Acid Salt and Sulfur Dioxide Using Propylene Glycol Monomethyl Ether Solvent)

A 100-ml three-neck flask equipped with a stirrer, a thermometer, and a glass stopper was charged with 79.90 g (an amount corresponding to the monomer concentration of 20% by mass) of propylene glycol monomethyl ether, 0.07 mol of methane sulfonic acid, and 0.07 mol of diallylethylamine with ice-water cooling. After charging 0.07 mol of sulfur dioxide with cooling at a temperature of 20° C. or lower, the temperature was raised to 30° C. and an initiator V-70 was added in an amount of 5% by mass relative to the monomers and polymerization was carried out. The GPC yield after 24 hours was 95.84%, and a copolymer having the $M_W$ of 253,281 in a milk white emulsion solution form was obtained.

Example 9 (Production of a Copolymer of Diallylmethylethylammonium Ethylsulfate and Sulfur Dioxide Using Propylene Glycol Monomethyl Ether Solvent)

A 50-ml three-neck flask equipped with a stirrer, a thermometer, and a glass stopper was charged with 39.53 g (an amount corresponding to the monomer concentration of 20% by mass) of propylene glycol monomethyl ether and 0.03 mol of diallylmethylethylammonium ethylsulfate. After charging 0.03 mol of sulfur dioxide with cooling at a temperature of 25° C. or lower in ice water, the temperature was raised to 30° C. and an initiator V-70 was added in an amount of 5% by mass relative to the monomers and polymerization was carried out. The GPC yield after 24 hours was 9.86%, and a copolymer having the $M_W$ of 235,743 in a milk white emulsion solution form was obtained.

Example 10 (Production of a Copolymer of Diallylmethylamine-Methane Sulfonic Acid Salt and Sulfur Dioxide Using Ethylene Glycol Solvent)

A 50-ml three-neck flask equipped with a stirrer, a thermometer, and a glass stopper was charged with 37.99 g (an amount corresponding to the monomer concentration of 20% by mass) of ethylene glycol, 0.035 mol of methane sulfonic acid, and 0.035 mol of diallylmethylamine with ice cooling. After charging 0.035 mol of sulfur dioxide with cooling at a temperature of 20° C. or lower, the temperature was raised to 30° C. and V-65 (2,2'-azobis(2,4-dimethylvaleronitrile)) was added in an amount of 5% by mass, and after 1 hour, the temperature was raised to 40° C. and polymerization was carried out. The GPC yield after 48 hours was 95.46%, and a copolymer having the $M_W$ of 390,590 in a colorless liquid form was obtained.

Example 11 (Production of a Copolymer of Diallylmethylamine-Methane Sulfonic Acid Salt and Sulfur Dioxide Using Ethylene Glycol Solvent)

A 50-ml three-neck flask equipped with a stirrer, a thermometer, and a glass stopper was charged with 37.99 g (an amount corresponding to the monomer concentration of 20% by mass) of ethylene glycol, 0.035 mol of methane sulfonic acid, and 0.035 mol of diallylmethylamine with ice cooling. After charging 0.035 mol of sulfur dioxide with cooling at a temperature of 20° C. or lower, V-60 (2,2'-azobisisobutyronitrile) was added in an amount of 5% by mass, the temperature was raised to 50° C. and polymerization was carried out. The GPC yield after 24 hours was 100%/o, and a copolymer having the $M_W$ of 462,425 in a colorless liquid form was obtained.

Example 12 (Production of a Copolymer of Diallylmethylamine-Methane Sulfonic Acid Salt and Sulfur Dioxide Using Ethylene Glycol Solvent)

A 50-ml three-neck flask equipped with a stirrer, a thermometer, and a glass stopper was charged with 37.99 g (an amount corresponding to the monomer concentration of 20% by mass) of ethylene glycol, 0.035 mol of methane sulfonic acid, and 0.035 mol of diallylmethylamine with ice cooling. After charging 0.035 mol of sulfur dioxide with cooling at a temperature of 30° C. or lower, V-601 (dimethyl 2,2'-azobis (2-methylpropionate)) was added in an amount of 5% by mass, the temperature was raised to 50° C. and polymerization was carried out. The GPC yield after 24 hours was 100%, and a copolymer having the $M_W$ of 506,951 in a colorless liquid form was obtained.

Comparative Example 1 (Production of a Copolymer of Diallylamine-Methane Sulfonic Acid Salt and Sulfur Dioxide Using Dimethyl Sulfoxide Solvent)

A 100-ml three-neck flask equipped with a stirrer, a thermometer, and a glass stopper was charged with 72.04 g (an amount corresponding to the monomer concentration of 20% by mass) of dimethyl sulfoxide, 0.07 mol of methane sulfonic acid, and 0.07 mol of diallylamine with ice-water cooling. After charging 0.07 mol of sulfur dioxide with cooling at a temperature of 30° C. or lower, the temperature was raised to 30° C. and an initiator V-70 was added in an amount of 5% by mass relative to the monomers and polymerization was carried out. The GPC yield after 24 hours was 92.47%, and a copolymer having the $M_W$ of 67,873 in a yellow liquid form having a peculiar odor was obtained.

Comparative Example 2 (Production of a Copolymer of Diallylamine-Methane Sulfonic Acid Salt and Sulfur Dioxide Using Dimethylformamide Solvent)

A 100-ml three-neck flask equipped with a stirrer, a thermometer, and a glass stopper was charged with 72.04 g (an amount corresponding to the monomer concentration of 20% by mass) of dimethylformamide, 0.07 mol of methane sulfonic acid, and 0.07 mol of diallylamine with ice-water cooling. After charging 0.07 mol of sulfur dioxide with cooling at a temperature of 30° C. or lower, the temperature was raised to 30° C. and an initiator V-70 was added in an amount of 5% by mass relative to the monomers and polymerization was carried out. The GPC yield after 24 hours was 92.67%, and a copolymer having the $M_W$ of 86,965 in a white emulsified form was obtained.

Comparative Example 3 (Diallylmethylamine-Methane Sulfonic Acid Salt Polymer Using Ethylene Glycol Solvent)

As comparison, a production test under the condition where sulfur dioxide was not charged was carried out. A 50-ml three-neck flask equipped with a stirrer, a thermometer, and a glass stopper was charged with 37.31 g (an amount corresponding to the monomer concentration of 20% by mass) of ethylene glycol, 0.045 mol of methane sulfonic acid, and 0.045 mol of diallylmethylamine with ice-water cooling, and then the temperature was raised to 30° C., an initiator V-70 was added in an amount of 5% by mass relative to the monomers, and polymerization was carried out. The GPC yield after 24 hours was 12.91%, and a pale yellow lowly viscous liquid having the $M_W$ of 1,617 was obtained.

Comparative Example 4 (Production of a Copolymer of Diallylamine Hydrochloride and Sulfur Dioxide Using Water Solvent)

A 100-ml three-neck flask equipped with a stirrer, a thermometer, and a glass stopper was charged with 24.00 g (an amount corresponding to the monomer concentration of 55% by mass) of dilution water and 0.25 mol of aqueous diallylaminehydrochloride solution. After charging 0.25 mol of sulfur dioxide with cooling at a temperature of 20° C. or lower, APSaq (a 28.5% by mass diluted aqueous solution of ammonium persulfate) was added in an amount of 0.4 mol % relative to the monomers in four portions, and polymerization was carried out at 15 to 30° C. The GPC yield after 24 hours was 91.7%, and a copolymer having the $M_W$ of 2,172 in a pale yellow liquid form was obtained.

The results of Examples and Comparative Examples are given in Table 1.

As apparent from Table 1, in Examples of the present application, in which ethylene glycol or propylene glycol monomethyl ether was used as a solvent, copolymers of a diallylamine and sulfur dioxide having a weight average molecular weight ($M_w$) of 150,000 or more and a degree of polymerization of 1.000 or more were obtained. These copolymers are low in halogen content because hydrochloride or the like was not used as the monomer diallylamine.

In Comparative Examples 1 and 2, in which solvents other than ethylene glycol and propylene glycol monomethyl ether were used, the weight average molecular weight ($M_w$) was not able to reach 150,000 and the degree of polymerization was less than 1,000.

In Comparative Example 3, in which sulfur dioxide was not used as a copolymerization component, the polymerization yield was low and both the weight average molecular weight ($M_w$) and the degree of polymerization were remarkably low because the polymerization proceeded remarkably slowly.

INDUSTRIAL APPLICABILITY

According to the copolymer of a diallylamine and sulfur dioxide of the present invention and the production method thereof, there are provided a copolymer of a diallylamine and sulfur dioxide having a high molecular weight and being low in content of impurities such as halogens and a production method by which such a copolymer can be produced relatively simply at low cost, and such a copolymer and a production method have high utility value and high applicability in various industries.

The invention claimed is:

1. A production method of a copolymer, comprising the step of copolymerizing a sulfonic acid salt or alkylsulfate

|   | Copolymer | Polymerization yield | Unit MW | Average MW | Degree of polymerization | Initiator | Solvent | Polymerization temperature | Appearance |
|---|---|---|---|---|---|---|---|---|---|
| Example 1 | Diallylamine-methanesulfonic acid salt/sulfur dioxide | 94.86% | 128.65 | 323.151 | 2.512 | V-70 | EG | 30° C. | Pale yellow solution |
| Example 2 | Diallylmethylamine-methanesulfonic acid salt/sulfur dioxide | 97.00% | 135.67 | 533.470 | 3.932 | V-70 | EG | 30° C. | Colorless solution |
| Example 3 | Diallylethylamine-methanesulfonic acid salt/sulfur dioxide | 97.55% | 142.68 | 284.344 | 1.993 | V-70 | EG | 30° C. | Pale yellow solution |
| Example 4 | Diallylmethylethylammonium ethylsulfate/sulfur dioxide | 95%* | 164.71 | 283.479 | 1.721 | V 70 | EG | 30° C. | Colorless solution |
| Example 5 | Diallyldiethylammonium ethylsulfate/sulfur dioxide | 95.29% | 171.72 | 178.786 | 1.041 | V-70 | EG | 30° C. | Pale yellow solution |
| Example 6 | Diallylamine-methanesulfonic acid salt/sulfur dioxide | 95.96% | 128.65 | 159.206 | 1.238 | V-70 | PM | 30° C. | White emulsified solution |
| Example 7 | Diallylmethylamine-methanesulfonic acid salt/sulfur dioxide | 94.06% | 135.67 | 199.065 | 1.467 | V-70 | PM | 30° C. | White emulsified solution |
| Example 8 | Diallylethylamine-methanesulfonic acid salt/sulfur dioxide | 95.84% | 142.68 | 253.281 | 1.775 | V-70 | PM | 30° C. | White emulsified solution |
| Example 9 | Diallylmethylethylammonium ethylsulfate/sulfur dioxide | 96.86% | 164.71 | 233.743 | 1.431 | V-70 | PM | 30° C. | White emulsified solution |
| Example 10 | Diallylmethylamine-methanesulfonic acid salt/sulfur dioxide | 95.46% | 135.67 | 390.590 | 2.879 | V-65 | EG | 40° C. | Colorless solution |
| Example 11 | Diallylmethylamine-methanesulfonic acid salt/sulfur dioxide | 100% | 135.67 | 462.425 | 3.409 | V-60 | EG | 50° C. | Colorless solution |
| Example 12 | Diallylmethylamine-methanesulfonic acid salt/sulfur dioxide | 100% | 135.67 | 506.951 | 3.737 | V-601 | EG | 50° C. | Colorless solution |
| Comparative Example 1 | Diallylamine-methanesulfonic acid salt/sulfur dioxide | 92.47% | 128.65 | 67.873 | 528 | V-70 | DMSO | 30° C. | Colorless solution |
| Comparative Example 2 | Diallylamine-methanesulfonic acid salt/sulfur dioxide | 92.67% | 128.65 | 86.965 | 676 | V-70 | DMF | 30° C. | White emulsified solution |
| Comparative Example 3 | Diallylmethylamine-methanesulfonic acid salt | 12.91% | 103.65 | 1.617 | 16 | V-70 | EG | 30° C. | Pale yellow solution |
| Comparative Example 4 | Diallylamine hydrochloride/sulfur dioxide | 91.70% | 98.84 | 2.172 | 22 | APS | 水 | 15~30 | Pale yellow solution |

Solvent:
EG: ethylene glycol,
PM: propylene glycol monomethyl ether,.
DMSO: dimethyl sulfoxide
Initiators:
V-70: 2,2'-azobis(4-methoxy-2,4'-dimethylvaleronitrile),
V-65: 2,2'-azobis(2,4-dimethylvaleronitrile),
V-60: 2,2'-azobisisobutyronitrile,
V-601: dimethyl 2,2'-azobis(2-methylpropionate),
APS: ammonium persulfate Monomer polymerization concentration: 20%
*A presumed polymerization yield is adopted because the monomer peak and the solvent peak overlap and make it difficult to distinguish between the two.

salt of a diallylamine represented by Structural Formula 1, wherein $R_1$ and $R_2$ are each independently a hydrogen atom or a hydrocarbon group having 1 to 3 carbon atoms and X— is a sulfonic acid ion having 1 to 3 carbon atoms or an alkylsulfate ion having 1 to 3 carbon atoms, and sulfur dioxide represented by Structural Formula 2 in ethylene glycol or propylene glycol monomethyl ether, wherein the sulfonic acid salt or alkylsulfate salt of a diallylamine and the sulfur dioxide are present at a concentration of 1 to 70% by mass in the ethylene glycol or the propylene glycol monomethyl ether

[Chemical Formula 3]

Structural Formula 1

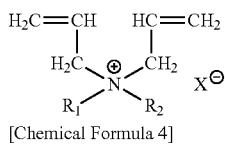

[Chemical Formula 4]

Structural Formula 2

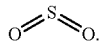

2. The production method according to claim 1, wherein the proportion of the sulfonic acid salt or alkyl sulfate salt of a diallylamine and the sulfur dioxide to all of the monomers to be subjected to the copolymerization step is 90 mol % or more.

3. The production method according to claim 1, wherein the molar ratio of the sulfonic acid salt or alkylsulfate salt of a diallylamine to the sulfur dioxide to be subjected to the copolymerization step is from 0.7:1 to 1.3:1.

4. The production method according to claim 1, wherein the copolymerization step is a step of obtaining a solution or a dispersion by performing polymerization in ethylene glycol or propylene glycol monomethyl ether.

5. The production method according to claim 1, wherein a radical initiator that substantially does not start a redox reaction with sulfur dioxide at temperatures of from 0° C. to 100° C. is used in the copolymerization step.

6. The production method according to claim 5, wherein the radical initiator is an aliphatic azo compound.

\* \* \* \* \*